(12) United States Patent
Andersen et al.

(10) Patent No.: US 10,590,567 B2
(45) Date of Patent: *Mar. 17, 2020

(54) CARBON-CONTAINING MODACRYLIC AND ARAMID BICOMPONENT FILAMENT YARNS

(71) Applicant: DUPONT SAFETY & CONSTRUCTION, INC., Wilmington, DE (US)

(72) Inventors: Mark William Andersen, Charlottesville, VA (US); Mark T. Aronson, Midlothian, VA (US); Christopher William Newton, Richmond, VA (US); Thomas Wayne Steinruck, Glen Allen, VA (US); B Lynne Wiseman, Richmond, VA (US); Reiyao Zhu, Moseley, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/669,102

(22) Filed: Aug. 4, 2017

(65) Prior Publication Data

US 2018/0057969 A1    Mar. 1, 2018

Related U.S. Application Data

(60) Provisional application No. 62/382,572, filed on Sep. 1, 2016.

(51) Int. Cl.
*D02G 3/04* (2006.01)
*D02G 3/44* (2006.01)
(Continued)

(52) U.S. Cl.
CPC .......... *D02G 3/047* (2013.01); *A41D 13/008* (2013.01); *A41D 13/02* (2013.01); *B29C 48/022* (2019.02);
(Continued)

(58) Field of Classification Search
CPC .. A41D 13/008; A41D 13/02; A41D 2600/20; A41D 31/26; B29C 24/022;
(Continued)

(56) References Cited

U.S. PATENT DOCUMENTS 2,936,482 A    5/1960   Kilian
3,038,239 A    6/1962   Moulds
(Continued)

FOREIGN PATENT DOCUMENTS

EP    0568912 A1    11/1993
GB    1409258 A     10/1975
(Continued)

OTHER PUBLICATIONS

International Search Report, dated Dec. 4, 2017, for international application No. PCT/US2017/046594, International filing date Aug. 11, 2017; ISA/European Patent Office; Authorized officer Didier Pollet.

(Continued)

*Primary Examiner* — Arti Singh-Pandey

(57) ABSTRACT

A yarn comprising a plurality of bicomponent filaments having a first region comprising a first polymer composition and a second region comprising a second polymer composition, each of the first and second regions being distinct in the bicomponent filaments; each bicomponent filament comprising 5 to 60 weight percent of the first polymer composition and 95 to 40 weight percent of the second polymer composition; wherein the first polymer composition comprises aramid polymer containing 0.5 to 20 weight percent (Continued)

discrete homogeneously dispersed carbon particles and the second polymer composition comprises modacrylic polymer being free of discrete carbon particles; the yarn having a total content of 0.1 to 5 weight percent discrete carbon particles.

12 Claims, 1 Drawing Sheet

(51) Int. Cl.
| | |
|---|---|
| *D01D 4/02* | (2006.01) |
| *D01D 10/06* | (2006.01) |
| *D01D 10/02* | (2006.01) |
| *D01D 5/26* | (2006.01) |
| *D01D 5/38* | (2006.01) |
| *A41D 13/008* | (2006.01) |
| *A41D 13/02* | (2006.01) |
| *B29C 48/05* | (2019.01) |
| *B29C 48/21* | (2019.01) |
| *B29C 48/00* | (2019.01) |
| *D01F 1/09* | (2006.01) |
| *D01F 8/08* | (2006.01) |
| *D01F 8/12* | (2006.01) |
| *D01F 1/10* | (2006.01) |
| *B29K 77/00* | (2006.01) |
| *B29L 31/00* | (2006.01) |
| *A41D 31/26* | (2019.01) |

(52) U.S. Cl.
CPC .............. *B29C 48/05* (2019.02); *B29C 48/21* (2019.02); *D01D 4/02* (2013.01); *D01D 5/26* (2013.01); *D01D 5/38* (2013.01); *D01D 10/02* (2013.01); *D01D 10/06* (2013.01); *D01F 1/09* (2013.01); *D01F 1/106* (2013.01); *D01F 8/08* (2013.01); *D01F 8/12* (2013.01); *D02G 3/441* (2013.01); *D02G 3/443* (2013.01); *A41D 31/26* (2019.02); *A41D 2600/20* (2013.01); *B29K 2077/00* (2013.01); *B29K 2995/0016* (2013.01); *B29L 2031/707* (2013.01); *D10B 2321/101* (2013.01); *D10B 2331/021* (2013.01)

(58) Field of Classification Search
CPC . B29C 48/05; B29C 48/21; B29K 2995/0016; B29K 2031/707; D01D 10/02; D01D 10/06; D01D 4/02; D01D 5/26; D01D 5/38; D01F 1/09; D01F 1/106; D01F 8/08; D01F 8/12; D02G 3/441; D02G 3/443; D10B 2321/101; D10B 2331/021
See application file for complete search history.

(56) References Cited

U.S. PATENT DOCUMENTS

| | | | |
|---|---|---|---|
| 3,094,511 A | | 6/1963 | Hill, Jr. et al. |
| 3,193,602 A | | 7/1965 | Leonard et al. |
| 3,354,127 A | | 11/1967 | Hill, Jr. et al. |
| 3,541,198 A | | 11/1970 | Ueda et al. |
| 3,673,143 A | | 6/1972 | Bair et al. |
| 3,748,302 A | | 7/1973 | Jones |
| 3,803,453 A | | 4/1974 | Hull |
| 3,819,587 A | | 6/1974 | Kwoleck |
| 3,869,429 A | | 3/1975 | Blades |
| 4,172,938 A | | 10/1979 | Mera et al. |
| 4,309,476 A | | 1/1982 | Nakamura et al. |
| 4,398,995 A | | 8/1983 | Sasaki et al. |
| 4,457,973 A | | 7/1984 | Matsui et al. |
| 4,473,617 A | * | 9/1984 | van Leeuwen .......... D01D 5/34 264/172.15 |
| 4,612,150 A | | 9/1986 | De Howitt |
| 4,803,453 A | | 2/1989 | Tomono et al. |
| 5,208,105 A | | 5/1993 | Ichibori et al. |
| 5,505,889 A | | 4/1996 | Davies |
| 5,506,042 A | | 4/1996 | Ichibori et al. |
| 7,065,950 B2 | | 6/2006 | Zhu et al. |
| 7,348,059 B2 | | 3/2008 | Zhu et al. |
| 10,253,437 B2 | * | 4/2019 | Zhu ..................... D02G 3/047 |
| 2018/0057964 A1 | * | 3/2018 | Andersen ............ A41D 13/008 |

FOREIGN PATENT DOCUMENTS

| | | |
|---|---|---|
| JP | 05263318 | 10/1993 |
| JP | 2008297684 | 12/2008 |
| WO | 0077283 A2 | 12/2000 |

OTHER PUBLICATIONS

International Search Report, dated Dec. 4, 2017, for international application No. PCT/US2017/046586, International filing date Aug. 11, 2017; ISA/European Patent Office; Authorized officer Didier Pollet.
Black et al., Section titled "Fiber-Forming Aromatic Polyamides", Man-Made Fibers—Science and Technology, vol. 2, p. 298-299, Interscience Publishers, 1968.

* cited by examiner

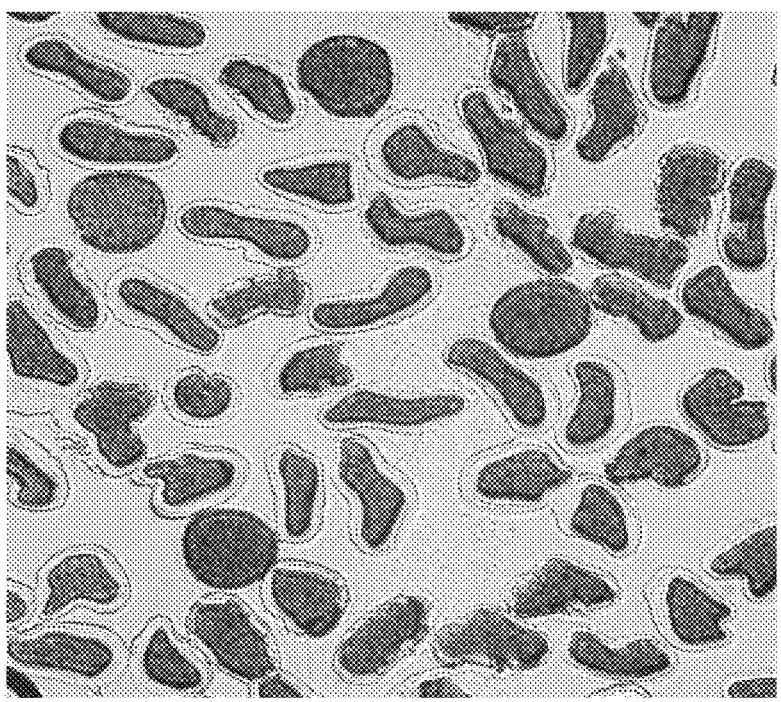

CARBON-CONTAINING MODACRYLIC AND ARAMID BICOMPONENT FILAMENT YARNS

BACKGROUND OF THE INVENTION

Field of the Invention. This invention relates to yarns of bicomponent filaments suitable for use in arc protection, wherein each filament has a distinct region of aramid polymer having discrete carbon particles homogeneously dispersed therein and a distinct region of modacrylic polymer being free of discrete carbon particles.

Description of Related Art. U.S. Pat. No. 4,803,453 to Hull discloses melt-spun filaments having antistatic properties comprising a continuous, nonconductive sheath of a synthetic thermoplastic fiber-forming polymer surrounding an electrically conductive polymeric core comprised of electrically conductive carbon black dispersed in a thermoplastic synthetic polymer.

U.S. Pat. No. 4,309,476 to Nakamura et al. discloses a core-in-sheath type aromatic polyamide fiber having satisfactory dyeing properties made from a single aromatic polyamide material. When the core-in-sheath fiber is dyed with acid dyes, only the sheath portion is colored. U.S. Pat. No. 4,398,995 to Sasaki et al. discloses the use of the fiber of Nakamura in a paper.

U.S. Pat. No. 3,038,239 to Moulds discloses improved composite filaments that have crimp reversibility. The filaments have at least two hydrophobic polymers in eccentric relationship, wherein one of the hydrophobic polymers further contains mixed therewith a minor amount of polymer having a high water absorption rate.

U.S. Pat. Nos. 7,065,950 and 7,348,059 to Zhu et al. disclose a yarn, fabric, and garment for use in arc and flame protection that contains modacrylic, p-aramid, and m-aramid fibers. While these fiber blends have been found to be very useful in arc protection, any improvement in arc protection is welcomed as it can potentially save lives.

BRIEF SUMMARY OF THE INVENTION

This invention relates to a yarn comprising a plurality of bicomponent filaments, the bicomponent filaments having a first region comprising a first polymer composition and a second region comprising a second polymer composition, each of the first and second regions being distinct in the bicomponent filaments; each bicomponent filament comprising 5 to 60 weight percent of the first polymer composition and 95 to 40 weight percent of the second polymer composition; wherein the first polymer composition comprises aramid polymer containing 0.5 to 20 weight percent discrete carbon particles based on the amount of carbon particles in the first composition, homogeneously dispersed in the first region in the filament; and wherein the second polymer composition comprises modacrylic polymer being free of discrete carbon particles; the yarn having a total content of 0.1 to 5 weight percent discrete carbon particles.

This invention further relates to a process for forming a yarn comprising bicomponent filaments, each of the filaments comprising a distinct sheath of a modacrylic polymer free of discrete carbon particles and a distinct core of an aramid polymer comprising discrete carbon particles homogeneously dispersed therein, with the sheath surrounding the core; the process comprising the steps of:
a) forming a first polymer solution containing aramid polymer in a solvent, the aramid polymer solution further comprising discrete carbon particles, and forming a second polymer solution of modacrylic polymer being free of discrete carbon particles, in the same or different solvent;
b) providing a spinneret assembly having separate inlets for the first polymer solution and the second polymer solution and a plurality of exit capillaries for spinning dope filaments;
c) forming a plurality of dope filaments having a sheath of the second polymer solution and a core of the first polymer solution by extruding through the exit capillaries a plurality of conjoined streams of the first and the second solutions into a spin cell, and
d) extracting solvent from the plurality of dope filaments to make a yarn of polymer filaments.

This invention also relates to a process for forming a yarn comprising bicomponent filament having side-by-side structure, each of the filaments comprising a distinct first side of an aramid polymer comprising discrete carbon particles homogeneously dispersed therein and a distinct second side of a modacrylic polymer free of discrete carbon particles, the process comprising the steps of:
a) forming a first polymer solution containing aramid polymer in a solvent, the aramid polymer solution further comprising discrete carbon particles, and forming a second polymer solution of modacrylic polymer being free of discrete carbon particles, in the same or different solvent;
b) providing a spinneret assembly having separate inlets for the first polymer solution and the second polymer solution and a plurality of exit capillaries for spinning dope filaments;
c) forming a plurality of dope filaments having a first side of the first polymer solution and a second side of the second polymer solution in a side-by-side orientation by extruding through the exit capillaries a plurality of conjoined streams of the first and the second solutions into a spin cell, and
d) extracting solvent from the plurality of dope filaments to make a yarn of polymer filaments.

BRIEF DESCRIPTION OF THE DRAWINGS

FIG. 1 is an optical microscope image of the cross section of the sheath-core bicomponent filaments having a sheath of modacrylic polymer that is free of carbon particles and a core of poly(metaphenylene isophthalamide) polymer comprising carbon particles.

DETAILED DESCRIPTION OF THE INVENTION

This invention relates to yarns useful in the making of articles that provided arc protection for workers and other personnel. An arc flash is an explosive release of energy caused by an electrical arc. Electrical arcs typically involve thousands of volts and thousands of amperes of electrical current, exposing the garment to intense incident heat and radiant energy. To offer protection to a wearer, an article of protective apparel must resist the transfer of this incident energy through to the wearer. It has been believed that this occurs best when the article of protective apparel absorbs a portion of the incident energy while resisting what is called "break-open". During "break-open", a hole forms in the article. Therefore, protective articles or garments for arc protection have been designed to avoid or minimize break-open of any of the fabric layers in the garment.

It has been found that the arc performance of fabrics and garments can be increased on the order of almost two times by the addition of discrete carbon particles in the polymer of fire-resistant (i.e., having a limiting oxygen index greater than 21) and thermally stable fiber. As used herein, the term "thermally stable" means the polymer or fiber retains at least 90 percent of its weight when heated to 425 degrees Celsius at a rate of 10 degrees per minute.

On a fabric weight basis, a dramatic improvement has been found when the total amount of discrete carbon particles in the fabric is 0.1 to 3 weight percent, based on the total amount of fiber in the fabric. The presence of these carbon particles can have a significant effect on the fabric arc performance, as measured by ATPV, even at very low loadings. The best performance is found for carbon particles amounts of greater than about 0.5 weight percent in the fabric, with a preferred performance of 12 cal/cm$^2$ or greater occurring for fabrics having about 0.75 weight percent carbon particles or greater, with an especially desired range being 0.75 to 2 weight percent carbon particles in the fabric.

Specifically, this invention relates to a yarn comprising a plurality of bicomponent filaments, the bicomponent filaments having a first region comprising a first polymer composition and a second region comprising a second polymer composition; the regions being distinct and preferably uniform-density in the bicomponent filaments. Preferably the regions are in the form of a sheath-core structure with the first region being the core and the second region being the sheath. Alternatively, the regions are in the form of a side-by-side bicomponent structure. The first polymer composition comprises aramid polymer containing 0.5 to 20 weight percent discrete carbon particles based on the amount of carbon particles in the first composition, homogeneously dispersed in the first region in the filament. The second polymer composition comprises modacrylic polymer being free of discrete carbon particles. The yarn has a total content of 0.1 to 5 weight percent discrete carbon particles, based on the amount of carbon particles in all the bicomponent filaments in the yarn.

Therefore, this invention relates yarns of bicomponent filaments that have dispersed carbon particles that dramatically improved arc performance versus a blend of modacrylic and aramid fibers as disclosed in U.S. Pat. Nos. 7,065,950 and 7,348,059. In some embodiments, the filaments can be further colored in yarn, fabric or article form to help mask the presence of the black carbon particles in the fiber. In some embodiments the bicomponent filaments further include a spun-in pigment in the modacrylic polymer sheath to mask the presence of the black carbon-containing fiber in the yarn, fabric or article.

The yarn comprises a plurality of bicomponent filaments. "Bicomponent" means the filaments are formed from at least two polymer compositions that differ in some way. Since at least two differing polymer compositions are needed in the making of the bicomponent filaments, this means that two differing polymer solutions are made; however, the two differing polymer solutions can use the same or different solvent. Preferably the solvent is the same for the two differing polymer solutions.

The bicomponent filaments have a first region comprising a first polymer composition and a second region comprising a second polymer composition. The regions are distinct and preferably uniform-density in a sheath-core structure or a side-by-side structure. One representative region for the sheath-core structure is the sheath, while another representative region is the core. Side-by-side structures can have a more oblong or dog-bone shape in cross section, or can be more bean-shaped or round in cross section, so a representative region is either one side of the filament or the other. Further, the side-by-side structure can be made wherein the two sides or regions are similarly sized and substantially symmetrical, if the relative amounts of the two polymers are similar; or the side-by-side structure can be made wherein one side or region overlaps the other side or region; that is, one side or region covers more than 50 percent of the circumference of the other side or region. This can be the case when the relative amounts of the two polymers are very different, and one side or region can cover 75 percent or more of the circumference of the other side or region.

By "distinct" it is meant that the first and second polymer compositions are appreciably unmixed in the filament, and there is a distinct visible boundary between the two polymer regions that can be seen by visual inspection under suitable magnification using an optical or electron microscope. In the sheath-core structure, preferably the sheath is continuous. By "continuous" is meant, in the case of the sheath of the sheath-core filament, that the sheath polymer completely radially surrounds the core polymer, and that the coverage of the core polymer by the polymer sheath is substantially continuous linearly along the length of the filament. Preferably the core is continuous or semi-continuous. When referring to the core of the sheath-core filament, by "continuous" is meant the core polymer is substantially continuous linearly along the length of the filament, and "semi-continuous" means the core may have minor discontinuities linearly along the filament that do not appreciably affect the ability of the carbon particles in the core to function in the filaments as desired. In the side-by-side structure, preferably each of the sides is "continuous", meaning the polymer regions on each side of the bicomponent filament is substantially continuous linearly along its length. However, in some embodiments, the region or side containing the carbon particles can be continuous or semi-continuous, with semi-continuous meaning the carbon particle-containing region may have minor discontinuities linearly along the filament that do not appreciably affect the ability of the carbon particles in the filament to function in the filaments as desired. By the phrase "uniform-density" with regards to the sheath, it is meant that by visual inspection under suitable magnification using an optical or electron microscope the filament cross section shows the sheath to be generally solid and to be free of objectionable porosity. In preferred embodiments, a uniform-density core is also present in the filament. By "uniform-density" with regards to the core, and with regards to each of the sides in a side-by-side structure, it is meant that visual inspection under suitable magnification using an optical or electron microscope, a majority of the filament cross sections show the filaments to have solid, dense centers or character and to be relatively free of objectionable porosity and voids. In other words, in some preferred embodiments, the core has a substantially solid cross section and uniform density. Further, in some embodiments the sheath-core filaments are oval, oblong, bean-shaped, cocoon-shaped, dog-bone-shaped, or a mixture of these.

There is no requirement that the core be centered in the sheath, or that the thickness of the sheath or core be absolutely the same for each filament, since each filament can have slight differences in shape due to the inability to control all forces on the filaments during formation. However, the relative amount of the polymers or polymer solutions that are used can provide average final dimensions.

The first polymer composition comprises aramid polymer containing 0.5 to 20 weight percent discrete carbon particles, and those carbon particles are homogenously dispersed in the first region of the filament. When the bicomponent structure is sheath core, the first region is the core of the filament; when the bicomponent structure is side-by-side, the first region is one of the sides of the filament. The phrase "homogeneously dispersed" means that the carbon particles can be found in the region uniformly distributed in both the axial and radial directions in the desired region in the fiber. In some embodiments, the first polymer composition comprises aramid polymer containing 0.5 to 15 weight percent discrete carbon particles; and in some other embodiments the first polymer composition comprises aramid polymer containing 0.5 to 10 weight percent discrete carbon particles. In some embodiments, the first polymer composition comprises aramid polymer containing 0.5 to 6 weight percent discrete carbon particles. In some embodiments it is desirable the first polymer composition comprises aramid polymer containing 5 to 10 weight percent discrete carbon particles. In some embodiments, each bicomponent filament has a total content of 0.5 to 3 weight percent discrete carbon particles, based on the total weight of each filament.

The first polymer composition comprises aramid polymer that preferably has a Limiting Oxygen Index (LOI) above the concentration of oxygen in air (that is, greater than 21 and preferably greater than 25). This means the fiber or a fabric made solely from that fiber will not support flame in the normal oxygen concentrations in air and is considered fire-resistant. The first polymer further preferably retains at least 90 percent of its weight when heated to 425 degrees Celsius at a rate of 10 degrees per minute, meaning that this polymer has high thermal stability. It is believed the combination of this fire-resistant and thermally stable polymer and the discrete carbon particles synergistically provide the improve arc performance.

As present in the fiber, the carbon particles have an average particle size of 10 micrometers or less, preferably averaging 0.1 to 5 micrometers; in some embodiments an average particle size of 0.5 to 3 micrometers is preferred. In some embodiments an average particle size of 0.1 to 2 micrometers is desirable; and in some embodiments an average particle size of 0.5 to 1.5 micrometers is preferred. Carbon particles include such things as carbon black produced by the incomplete combustion of heavy petroleum products and vegetable oils. Carbon black is a form of paracrystalline carbon that has a higher surface-area-to-volume ratio than soot but lower than that of activated carbon. The particles can be incorporated into the fibers by adding the carbon particles to the spin dope prior to the formation of the fibers via spinning. In the case of a sheath-core filament, preferably the first polymer composition containing carbon particles is present in the core of the filament.

Essentially any commercially available carbon-black can be used to supply the discrete carbon particles to the aramid polymer composition. In one preferred practice, a separate stable dispersion of the carbon-black in a polymer solution, preferably an aramid polymer solution, is first made, and then the dispersion is milled to achieve a uniform particle distribution. This dispersion is the preferably injected into the aramid polymer solution prior to spinning to form the first polymer composition.

The second polymer composition comprises modacrylic polymer, but is free of discrete carbon particles, meaning that the filament region containing that composition in the does not contain carbon particles as defined herein.

By modacrylic polymer it is meant preferably the polymer is a copolymer comprising 30 to 70 weight percent of acrylonitrile and 70 to 30 weight percent of a halogen-containing vinyl monomer. The halogen-containing vinyl monomer is at least one monomer selected, for example, from vinyl chloride, vinylidene chloride, vinyl bromide, vinylidene bromide, etc.

In some embodiments the modacrylic copolymers are those of acrylonitrile combined with vinylidene chloride. In some embodiments, the modacrylic copolymer has in addition antimony oxide or antimony oxides. In some preferred embodiments the modacrylic copolymer has either less than 1.5 weight percent antimony oxide or antimony oxides, or the copolymer is totally free of antimony. Very low antimony content polymer and antimony-free polymer can be made by restricting the amount of, or eliminating entirely, any antimony compounds added to the copolymer during manufacture. Representative processes for modacrylic polymers, including those that can be modified in this manner are disclosed in U.S. Pat. No. 3,193,602 having 2 weight percent antimony trioxide; U.S. Pat. No. 3,748,302 made with various antimony oxides that are present in an amount of at least 2 weight percent and preferably not greater than 8 weight percent; and U.S. Pat. Nos. 5,208,105 & 5,506,042 having 8 to 40 weight percent of an antimony compound.

In some embodiments, within the modacrylic polymer has an LOI of at least 26. In one preferred embodiment the modacrylic polymer has a LOI of at least 26 while also being antimony-free.

In one alternative embodiment, the second polymer composition; that is, the modacrylic polymer composition, further has at least one pigment homogeneously dispersed therein to help enable the region in which that second polymer composition is present to preferably mask the present of the carbon particles in the other region of the filament. In some embodiments, the at least one masking pigment is present in the modacrylic polymer composition in an amount of 5 to 25 weight percent. In some other embodiments, the at least one masking pigment is present in the modacrylic polymer composition in an amount of 10 to 20 weight percent. In some embodiments, the at least one masking pigment is present in the bicomponent filaments in an amount of 2.5 to 22.5 weight percent, based on the total bicomponent filament weight. One especially preferred pigment is titanium dioxide ($TiO_2$).

As used herein, "aramid" is meant a polyamide wherein at least 85% of the amide (—CONH—) linkages are attached directly to two aromatic rings. Additives can be used with the aramid and, in fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Suitable aramid fibers are described in Man-Made Fibers-Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511.

In some preferred embodiments the aramid polymer is a meta-aramid. Meta-aramid are those aramids where the amide linkages are in the meta-position relative to each other. Preferably the meta-aramid polymer has an LOI typically at least about 25. One preferred meta-aramid is poly(metaphenylene isophthalamide).

The bicomponent filaments comprise 5 to 60 weight percent of the first polymer composition, which is the aramid polymer composition, and 95 to 40 weight percent of the second polymer composition, which is the modacrylic polymer composition. In other words, in the case of sheath/core filaments, the sheath/core weight ratio ranges from 95:5 to 40:60. In some embodiments, the bicomponent filaments comprise 5 to 50 weight percent of the first polymer composition and 95 to 50 weight percent of the second polymer composition, or a sheath/core weight ratio range of from 95:5 to 50:50. In some embodiments, the bicomponent filaments comprise 30 to 60 weight percent of the first polymer composition and 70 to 40 weight percent of the second polymer composition or a sheath/core weight ratio range of from 70:30 to 40:60.

In one embodiment, this invention further to a process for forming a yarn comprising bicomponent filaments, each of the filaments comprising a distinct, preferably uniform-density, sheath of a modacrylic polymer free of discrete carbon particles, and a distinct core of an aramid polymer comprising discrete carbon particles homogeneously dispersed therein, with the sheath surrounding the core; the process comprising the steps of:
 a) forming a first polymer solution containing the aramid polymer in a solvent, the aramid polymer solution further comprising discrete carbon particles, and forming a second polymer solution containing modacrylic polymer being free of discrete carbon particles, in the same or different solvent;
 b) providing a spinneret assembly having separate inlets for the first polymer solution and the second polymer solution and a plurality of exit capillaries for spinning dope filaments;
 c) forming a plurality of dope filaments having a sheath of the second polymer solution and a core of the first polymer solution by extruding through the exit capillaries a plurality of conjoined streams of the first and the second solutions into a spin cell, and
 d) extracting solvent from the plurality of dope filaments to make a yarn of polymer filaments.

If desired, the second polymer solution composition further comprises at least one masking pigment.

In some embodiments the process is accomplished using dry spinning. In this embodiment, the extracting of solvent from the plurality of dope filaments to make a yarn includes the steps of:
 i) contacting the dope filaments with heated gas in the spin cell to remove solvent from the dope filaments to form reduced solvent filaments;
 ii) quenching the reduced solvent filaments with an aqueous liquid to cool the filaments, forming a yarn of polymer filaments; and
 iii) further extracting solvent from the yarn of polymer filaments by washing and heating the yarn.

In one embodiment, this invention relates to a process for forming a yarn comprising bicomponent filament having side-by-side structure, each of the filaments comprising particles a distinct first side of an aramid polymer comprising discrete carbon particles homogeneously dispersed therein, and a distinct, preferably uniform-density second side of a modacrylic polymer free of discrete carbon particles, the process comprising the steps of:
 a) forming a first polymer solution containing aramid polymer in a solvent, the aramid polymer solution further comprising discrete carbon particles, and forming a second polymer solution of modacrylic polymer being free of discrete carbon particles, in the same or different solvent;
 b) providing a spinneret assembly having separate inlets for the first polymer solution and the second polymer solution and a plurality of exit capillaries for spinning dope filaments;
 c) forming a plurality of dope filaments having a first side of the first polymer solution and a second side of the second polymer solution in a side-by-side orientation by extruding through the exit capillaries a plurality of conjoined streams of the first and the second solutions into a spin cell, and
 d) extracting solvent from the plurality of dope filaments to make a yarn of polymer filaments.

If desired, the second polymer solution composition further comprises at least one masking pigment.

In some embodiments the process for forming the side-by-side structure is accomplished using dry spinning. In this embodiment, the extracting of solvent from the plurality of dope filaments to make a yarn includes the steps of:
 i) contacting the dope filaments with heated gas in the spin cell to remove solvent from the dope filaments to form reduced solvent filaments;
 ii) quenching the reduced solvent filaments with an aqueous liquid to cool the filaments, forming a yarn of polymer filaments; and
 iii) further extracting solvent from the yarn of polymer filaments by washing and heating the yarn.

In some embodiments, this invention further relates to a process for forming a yarn comprising sheath-core bicomponent filaments having a core comprising carbon particles homogeneously dispersed therein wherein the yarn further comprises a pigment in the sheath of the bicomponent filaments for masking the presence of the carbon-containing core, preferably a titanium dioxide pigment. Alternatively, this invention further relates to a process for forming a yarn comprising bicomponent filaments having a side-by-side structure having a first side comprising carbon particles homogeneously dispersed therein wherein the yarn further comprises a pigment in the second side of the bicomponent filaments for masking the presence of the carbon-containing side, preferably a titanium dioxide pigment.

In one embodiment the process includes dry-spinning the yarns of sheath-core filaments. In general, the term "dry spinning" means a process for making filaments by extruding a polymer solution in continuous streams through spinneret holes into dope filaments into a heated chamber, known as a spin cell that is provided with a heated gaseous atmosphere. The heated gaseous atmosphere removes a substantial portion of the solvent, generally 40 percent or greater, from the dope filaments leaving semi-solid filaments having enough physical integrity that they can be further processed. This "dry spinning" is distinct from "wet spinning" or "air-gap wet spinning" (also known as air-gap spinning) wherein the polymer solution is extruded in or directly into a liquid bath or coagulating medium to regenerate the polymer filaments. In other words, in dry spinning a gas is the primary initial solvent extraction medium, and in wet spinning (and air-gap wet spinning) a liquid is the primary initial solvent extraction medium. In dry spinning, after sufficient removal of solvent from the dope filaments and the formation of semi-solid filaments, the filaments can then be treated with additional liquids to cool the filaments and possibly extract additional solvent from them. Subsequent washing, drawing, and heat treatments can further extract solvent from the filaments in the yarn.

In a preferred embodiment, in the heated spin cell the dope filaments are contacted or exposed to an environment that contains essentially only inert heated gas and amounts of the solvent removed from the dope filaments. Preferred inert gases are those that are gases at room temperature.

The process involves forming at least two different polymer compositions in differing solutions, one polymer solution containing modacrylic polymer in a solvent and being free of carbon particles but optionally further comprising a masking pigment that is not carbon black; and another polymer solution containing aramid polymer in preferably the same solvent and containing carbon particles.

The solvent is preferably selected from the group consisting of those solvents that also function as proton acceptors, for example dimethylforamide (DMF), dimethylacetamide (DMAc), N-methyl-2-pyrrolidone (NMP), and the like. Dimethyl sulfoxide (DMSO) may also be used as a solvent. Dimethylacetamide (DMAc) is one preferred solvent.

The solubility of any particular polymer in any particular solvent is dependent on a variety of parameters, including the relative amounts of polymer and solvent, the molecular weight or inherent viscosity of the polymer, the temperature of the system. Further, while a polymer may be initially soluble in a solvent, with time, the polymer may precipitate out of the solvent, meaning that the solution is not a stable solution.

In a preferred embodiment, the process uses at least two polymer solutions that are stable polymer spinning solutions. By "stable polymer spinning solution" it is meant that the polymer is soluble in the solvent or solvent system in a concentration and temperature suitable for spinning fibers, and that the polymer remains soluble in the solvent indefinitely. The term "solvent system" is meant to include a solvent and a solubility/stability aid such as an inorganic salt.

In some embodiments, aramid polymer will form a useful stable polymer spinning solution only if a solubilizing/stabilizing salt is present. Therefore, if desired and needed, the aramid polymer solution includes at least 4 percent inorganic salt by weight, based on the amount of the salt, the polymer, and the solvent in the solution, to maintain the polymer in solution. In some embodiments the solution includes at least 7 weight percent inorganic salt.

Inorganic salts that can be used include chlorides or bromides having cations selected from the group consisting of calcium, lithium, magnesium or aluminum. Calcium chloride or lithium chloride salts are preferred. As used herein, the word "salt" is meant to include the compounds that increase the solubility of the polymer in the selected solvent or help provide stable spinning solutions and excludes any additives (especially flame retardant additives) that might be salts but are only added to increase the limiting oxygen index of the polymer. Likewise, the term "salt-free" does not mean these LOI-increasing additives are not present, only that the inorganic salts mentioned previously are absent.

In some embodiments, modacrylic polymer will form a useful stable polymer spinning solution without a solubilizing/stabilizing salt being present. Such solutions are considered salt-free and are preferred.

Useful polymer solutions are those that can be extruded, preferably dry-spun, into useful dope filaments. Parameters that can be balanced to form useful polymer solutions include the polymer molecular weight and concentration of the polymer in the solvent. Obviously, the specific parameters are dependent on the polymer and solvent chosen. However, it is known that certain polymer solutions of a certain viscosity tend to make useful filaments. All of the variables that could impact viscosity, e.g., temperature, concentration, polymer and solvent type, polymer molecular weight, etc. can be used to create a useful polymer solution. Generally, such solutions have a so-called zero shear rate or Newtonian viscosity of about 10 to 1000 Pascal seconds (Pa-sec) and preferably about 50 to 500 Pa-sec.

After forming at least the first and the second compositions and solutions, the dry spinning process includes providing a spinneret assembly having separate inlets for the first solution and the second solution, and a plurality of exit capillaries for extruding (spinning) dope filaments. One preferred spinneret assembly useful for spinning the dope filaments is disclosed in U.S. Pat. No. 5,505,889 to Davies. However, other spinneret assemblies are potentially useful and can have many different features such as the spinneret assemblies shown in U.S. Pat. Nos. 2,936,482; and 3,541,198, which are just some of the possible spinneret assemblies that can be used.

The process can further involve forming a plurality of dope filaments having preferably a continuous sheath of the modacrylic polymer that is free of carbon particles and a continuous core of aramid polymer that contains carbon particles. The core need not be strictly continuous to provide adequate carbon particles for the bicomponent filaments to perform as desired. Alternatively, the plurality of dope filaments having a continuous region of the modacrylic polymer that is free of carbon particles is spun together with a continuous region of aramid polymer that contains carbon particles in a side-by-side bicomponent filament structure. Both of these filament structures are made by extruding through the exit capillaries in the spinneret assembly a plurality of conjoined streams of the first and second solutions into a spin cell. For the purposes herein, "spin cell" is meant to include any sort of chamber or bath that can remove solvent from the dope filaments.

In a preferred embodiment, the first solution and the second solution are supplied via separate inlets to and into the spinneret assembly where they are combined. In some embodiments the spinneret assembly distributes the two solutions such that the two solutions are both supplied to each exit capillary in the spinneret assembly, which forms a bicomponent dope filament preferably having a continuous sheath of the modacrylic polymer solution and a semi-continuous or continuous core of an aramid polymer solution, made by conjoining the first and second polymer solutions in each exit capillary of the spinneret. That is, the solutions are supplied in a manner suitable to provide a sheath-core filament structure and then extruded through the same exit capillary, each exit capillary being one of a plurality of exit capillaries in the spinneret assembly. While this is a preferred embodiment, any other arrangement of exit capillaries or apertures or methods that conjoins the first and second polymer solutions into suitable bicomponent dope filaments of the desired structures, such as the alternative side-by-side structure, can be used.

The preferred process continues with contacting the dope filaments with heated gas in the spin cell to remove solvent from the plurality of dope filaments to form reduced solvent filaments. The heated gas is generally an inert gas like nitrogen. In some embodiments the dope filaments are contacted solely with the heated gas in the spin cell.

In some embodiments, of the total solvent in the plurality of dope filaments, as much as 50 to 85 percent of that solvent is removed from the dope filaments in the spin cell. The dope filaments are therefore converted to reduced-solvent filaments in the spin cell. The reduced-solvent filaments are then quenched with an aqueous liquid to cool the filaments, forming a yarn of polymer filaments. The quench also serves to remove some of the surface tackiness from the filaments for more efficient downstream processing. Further, the quench can remove some additional solvent, and once quenched it is possible that 75 percent or higher of the total original solvent in the dope filaments has been removed. Additional steps to further extract solvent from the yarn of polymer filaments are then conducted. These steps can include additional washing, drawing, and/or heating or heat treating, as desired.

By "yarn" is meant an assemblage of fibers spun or twisted together to form a continuous strand. As used herein, a yarn generally refers to the assemblage of bicomponent filaments that are spun which are known as a continuous multifilament yarn. However, the filaments spun herein can be cut into staple fiber and converted into what is known in the art as a singles yarn, which is the simplest strand of textile material suitable for such operations as weaving and knitting. For example, a staple fiber yarn can be formed from the bicomponent fibers in staple fiber form, the yarn having more or less twist. When twist is present in a singles yarn, it is all in the same direction. As used herein the phrases "ply yarn" and "plied yarn" can be used interchangeably and refer to two or more yarns, i.e. singles yarns, twisted or plied together.

For purposes herein, the terms "fiber" and "filament" are used interchangeably and are defined as a relatively flexible, macroscopically homogeneous body having a high ratio of length to the width of the cross-sectional area perpendicular to that length. Also, such fibers preferably have a generally solid cross section for adequate strength in textile uses; that is, the fibers preferably are not appreciably voided or do not have a large quantity of objectionable voids.

If desired, the yarns can comprise the herein described bicomponent fibers that are blended with other fibers, in either continuous multifilament or staple form. Also, the yarns of bicomponent filaments can be cut into staple fibers. As used herein, the term "staple fibers" refers to fibers that are cut to a desired length or are stretch broken, or fibers that are made having a low ratio of length to the width of the cross-sectional area perpendicular to that length, when compared with continuous filaments. Man-made staple fibers are cut or made to a length suitable for processing on, for example, cotton, woolen, or worsted yarn spinning equipment. The staple fibers can have (a) substantially uniform length, (b) variable or random length, or (c) subsets of the staple fibers have substantially uniform length and the staple fibers in the other subsets have different lengths, with the staple fibers in the subsets mixed together forming a substantially uniform distribution.

In some embodiments, suitable staple fibers have a cut length of from 1 to 30 centimeters (0.39 to 12 inches). In some embodiments, suitable staple fibers have a length of 2.5 to 20 cm (1 to 8 in). In some preferred embodiments the staple fibers made by short staple processes have a cut length of 6 cm (2.4 in) or less. In some preferred embodiments the staple fibers made by short staple processes have a staple fiber length of 1.9 to 5.7 cm (0.75 to 2.25 in) with the fiber lengths of 3.8 to 5.1 cm (1.5 to 2.0 in) being especially preferred. For long staple, worsted, or woolen system spinning, fibers having a length of up to 16.5 cm (6.5 in) are preferred.

The staple fibers can be made by any process. For example, the staple fibers can be cut from continuous straight fibers using a rotary cutter or a guillotine cutter resulting in straight (i.e., non-crimped) staple fiber, or additionally cut from crimped continuous fibers having a saw tooth shaped crimp along the length of the staple fiber, with a crimp (or repeating bend) frequency of preferably no more than 8 crimps per centimeter. Preferably the staple fibers have crimp.

The staple fibers can also be formed by stretch breaking continuous fibers resulting in staple fibers with deformed sections that act as crimps. Stretch broken staple fibers can be made by breaking a tow or a bundle of continuous filaments during a stretch break operation having one or more break zones that are a prescribed distance creating a random variable mass of fibers having an average cut length controlled by break zone adjustment.

Spun staple yarn can be made from staple fibers using traditional long and short staple ring spinning processes that are well known in the art. However, this is not intended to be limiting to ring spinning because the yarns may also be spun using air jet spinning, open end spinning, and many other types of spinning that converts staple fiber into useable yarns. Spun staple yarns can also be made directly by stretch breaking using stretch-broken tow-to-top staple processes. The staple fibers in the yarns formed by traditional stretch break processes typically have length of up to 18 cm (7 in) long; however, spun staple yarns made by stretch breaking can also have staple fibers having maximum lengths of up to around 50 cm (20 in.) through processes as described for example in PCT Patent Application No. WO 0077283. Stretch broken staple fibers normally do not require crimp because the stretch-breaking process imparts a degree of crimp into the fiber.

The staple fiber made from the bicomponent filaments, or the bicomponent filaments themselves can further be used in a fiber blend if desired. By fiber blend it is meant the combination of two or more staple fiber types, or two or more continuous filaments, in any manner. Preferably the staple fiber blend is an "intimate blend", meaning the various staple fibers in the blend form a relatively uniform mixture of the fibers. In some embodiments the two or more staple fiber types are blended prior to or while the staple fiber yarn is being spun so that the various staple fibers are distributed homogeneously in the staple yarn bundle.

The blend optionally contains antistat fibers. One suitable fiber is a melt-spun thermoplastic antistatic fiber in an amount of 1 to 3 weight percent, such as those described in U.S. Pat. No. 4,612,150 to De Howitt and/or U.S. Pat. No. 3,803,453 to Hull. These fibers, while they contain carbon black, have a negligible impact on arc performance, since the fiber polymer does not have the combination of being flame resistant and thermally stable; that is, it does not have in combination a LOI of greater than 21 and does not retain at least 90 percent of its weight when heated to 425 degrees Celsius at a rate of 10 degrees per minute. In fact, such thermoplastic antistat fibers lose in excess of 35 weight percent when heated to 425 degrees Celsius at a rate of 10 degrees per minute. For the purposes herein, and to avoid any confusion, the total content in the weight percent of discrete carbon particles is based on the total weight of the fiber blend, excluding any minor amount of antistat fibers.

Fabrics can be made from the yarns, and in some embodiments the preferred fabrics can include, but are not limited to, woven or knitted fabrics. General fabric designs and constructions are well known to those skilled in the art. By "woven" fabric is meant a fabric usually formed on a loom by interlacing warp or lengthwise yarns and filling or crosswise yarns with each other to generate any fabric weave, such as plain weave, crowfoot weave, basket weave, satin weave, twill weave, and the like. Plain and twill weaves are believed to be the most common weaves used in the trade and are preferred in many embodiments.

By "knitted" fabric is meant a fabric usually formed by interlooping yarn loops by the use of needles. In many instances, to make a knitted fabric, spun staple yarn is fed to a knitting machine which converts the yarn to fabric. If desired, multiple ends or yarns can be supplied to the knitting machine either plied of unplied; that is, a bundle of yarns or a bundle of plied yarns can be co-fed to the knitting machine and knitted into a fabric, or directly into an article of apparel such as a glove, using conventional techniques. The tightness of the knit can be adjusted to meet any specific need. A very effective combination of properties for protective apparel has been found in for example, single jersey knit and terry knit patterns.

In some particularly useful embodiments, the spun staple yarns can be used to make arc-resistant and flame-resistant garments. In some embodiments the garments can have essentially one layer of the protective fabric made from the spun staple yarn. Garments of this type include jumpsuits, coveralls, pants, shirts, gloves, sleeves and the like that can be worn in situations such as chemical processing industries or industrial or electrical utilities where an extreme thermal event might occur. In one preferred embodiment, the garment is made from the fabric comprising the yarns described herein.

Protective articles or garments of this type include protective coats, jackets, jumpsuits, coveralls, hoods, etc. used by industrial personnel such as electricians and process control specialists and others that may work in an electrical arc potential environment. In a preferred embodiment, the protective garment is a coat or jacket, including a three-quarter length coat commonly used over the clothes and other protective gear when work on an electrical panel or substation is required.

In a preferred embodiment, the protective articles or garments in a single fabric layer have a ATPV of greater than 2 cal/cm$^2$/oz, which is at least a Category 1 or 2 arc rating or higher as measured by either of two common category rating systems for arc ratings. The National Fire Protection Association (NFPA) has 4 different categories with Category 1 having the lowest performance and Category 4 having the highest performance. Under the NFPA 70E system, Categories 1, 2, 3, and 4 correspond to a minimum threshold heat flux through the fabric of 4, 8, 25, and 40 calories per square centimeter, respectively. The National Electric Safety Code (NESC) also has a rating system with 3 different categories with Category 1 having the lowest performance and Category 3 having the highest performance. Under the NESC system, Categories 1, 2, and 3 correspond to a minimum threshold heat flux through the fabric of 4, 8, and 12 calories per square centimeter, respectively. Therefore, a fabric or garment having a Category 2 arc rating can withstand a thermal flux of 8 calories per square centimeter, as measured per standard set method ASTM F1959 or NFPA 70E.

In some embodiments, the fabrics and articles preferably have an "L*" value ranging from 30 to 70.

Test Methods

Arc Resistance. The arc resistance of fabrics of this invention is determined in accordance with ASTM F-1959-99 "Standard Test Method for Determining the Arc Thermal Performance Value of Materials for Clothing". Preferably fabrics of this invention have an arc resistance (ATPV) of at least 0.8 calories and more preferably at least 2 calories per square centimeter per ounce per square yard.

ThermoGravimetric Analysis (TGA). Fiber that retains at least 90 percent of its weight when heated to 425 degrees Celsius at a rate of 10 degrees per minute can be determined using a Model 2950 Thermogravimetric Analyzer (TGA) available from TA Instruments (a division of Waters Corporation) of Newark, Del. The TGA gives a scan of sample weight loss versus increasing temperature. Using the TA Universal Analysis program, percent weight loss can be measured at any recorded temperature. The program profile consists of equilibrating the sample at 50 degrees C.; ramping the temperature 10° C. per minute from 50 to 1000 degrees C.; using air as the gas, supplied at 10 ml/minute; and using a 500 microliter ceramic cup (PN 952018.910) sample container. A specific testing procedure is as follows. The TGA was programmed using the TGA screen on the TA Systems 2900 Controller. The sample ID was entered and the planned temperature ramp program of 20 degrees per minute selected. The empty sample cup was tared using the tare function of the instrument. The fiber sample was cut into approximately 1/16" (0.16 cm) lengths and the sample pan was loosely filled with the sample. The sample weight should be in the range of 10 to 50 mg. The TGA has a balance therefore the exact weight does not have to be determined beforehand. None of the sample should be outside the pan. The filled sample pan was loaded onto the balance wire making sure the thermocouple is close to the top edge of the pan but not touching it. The furnace is raised over the pan and the TGA is started. Once the program is complete, the TGA will automatically lower the furnace, remove the sample pan, and go into a cool down mode. The TA Systems 2900 Universal Analysis program is then used to analyze and produce the TGA scan for percent weight loss over the range of temperatures.

Limited Oxygen Index. The limited oxygen index (LOI) of fabrics of this invention is determined in accordance with ASTM G-125-00 "Standard Test Method for Measuring Liquid and Solid Material Fire Limits in Gaseous Oxidants".

Color Measurement. The system used for measuring color and spectral reflectance is the 1976 CIELAB color scale (L*-a*-b* system developed by the Commission Internationale de l'Eclairage). In the CIE "L*-a*-b*" system, color is viewed as point in three-dimensional space. The "L*" value is the lightness coordinate with high values being the lightest, the "a*" value is the red/green coordinate with "+a*" indicating red hue and "−a*" indicating green hue and the "b*" value is the yellow/blue coordinate with "+b*" indicating yellow hue and "−b*" indicating blue hue. A spectrophotometer was used to measure the color of samples, either in puffs of fiber or in fabric or garment form as indicated. Specifically, a Hunter Lab UltraScan® PRO spectrophotometer was used, including the industry standard of 10-degree observer and D65 illuminant. The color scale used herein uses the coordinates of the CIE ("L*-a*-b*) color scale with the asterisk, as opposed to the coordinates of the older Hunter color scale, which are designated ("L-a-b") without the asterisk.

Weight Percent of Carbon Particles. The nominal amount of carbon black in the fiber, when making the fiber, is determined by a simple mass balance of ingredients. After the fiber is made, the amount of carbon black present in the fiber can be determined by measuring the weight of a sample of fiber, removing the fiber by dissolution of the polymer in a suitable solvent that does not affect the carbon black particles, washing the remaining solids to remove any inorganic salts that are not carbon, and weighing the remaining solids. One specific method includes weighing about a gram of the fiber, yarn, or fabric to be tested and heating that sample in an oven at 105° C. for 60 minutes to remove any moisture, followed by placing the sample in a desiccator to cool to room temperature, followed by weighing the sample to obtain an initial weight to a precision of 0.0001 grams. The sample is then placed in a 250 ml flat bottom flask with a stirrer and 150 ml of a suitable solvent, for example 96% sulfuric acid, is added. The flask is then placed on a combination stir/heater with a chilled water condenser operating with enough flow to prevent any fumes from exiting the top of the condenser. The heat is then applied while stirring until the yarn is fully dissolved in the solvent. The flask is then removed from the heater and allowed to cool to room temperature. The contents of the flask are then vacuum filtered using a Millipore vacuum filter unit with a tared 0.2 micron PTFE filter paper. Remove the vacuum and then rinse the flask out with 25 ml of additional solvent, which is also passed through the filter. The Millipore unit is then removed from the vacuum flask and reset on a new clean glass vacuum flask. With vacuum, the residue on the filter paper is washed with water until a pH paper check on the filtrate indicates the wash water to be neutral. The residue is then finally washed with methanol. The filter paper with residue sample is removed, placed in a dish, and heated in an oven at 105° C. to dry for 20 minutes. The filter paper with residue sample in then put in a desiccator to cool to room temperature, followed by weighing the filter paper with residue sample to obtain the final weight to a precision of 0.0001 grams. The weight of the filter is subtracted from the weight of the filter paper with residue sample. This weight is then divided by the initial weight of the yarn or fiber or fabric and multiplied by 100. This will give the weight percentage of the carbon black in the fiber, yarn, or fabric.

Particle Size. Carbon particle size can be measured using the general provisions of ASTM B822-10—"Standard Test Method for Particle Size Distribution of Metal Powders and Related Compounds by Light Scattering".

Weight Percent of Pigments. The nominal amount of pigment in the fiber that is not carbon black, when making the fiber, is determined by a simple mass balance of ingredients. After the fiber is made, the amount of pigment present in the fiber can be determined by a general method of measuring the weight of a sample of fiber, ashing the sample, and weighing the remaining solids to calculate a weight percent. One specific method for determining the amount of $TiO_2$ in a fiber sample includes weighing about 5 grams of the fiber to be tested and heating that sample in an oven at 105° C. for 60 minutes to remove any moisture, followed by placing the sample in a desiccator for about 15 minutes to cool to room temperature. A synthetic quartz crucible is then placed in a muffle furnace operating at 800° C. for 15 minutes, after which it is removed and allowed to cool in a desiccator for 15 minutes. The crucible is then weighed to a precision of 0.0001 grams. The dried yarn sample is also weighed to a precision of 0.0001 grams to obtain its initial weight. The dried yarn sample is placed in the crucible, and the crucible with sample is then placed in the muffle furnace operating at 800° C. for 60 minutes. The crucible is then removed and is placed in a desiccator to cool for 15 minutes, after which the final sample plus crucible is weighed to a precision of 0.0001 grams. The amount of $TiO_2$ is then calculated by first subtracting the weight of the crucible from the weight of the final sample plus crucible, and then dividing that amount by the initial weight of the fiber sample, followed by multiplying by 100. This provides the amount of $TiO_2$ in weight percent.

Shrinkage. To test for fiber shrinkage at elevated temperatures, the two ends of a sample of multi-filament yarn to be tested are tied together with a tight knot such that the total interior length of the loop is approximately 1 meter in length. The loop is then tensioned until taut and the doubled length of the loop measured to the nearest 0.1 cm. The loop of yarn is then hung in an oven for 30 minutes at 185 degrees Celsius. The loop of yarn is then allowed to cool, it is re-tensioned and the doubled length is re-measured. Percent shrinkage is then calculated from the change in the linear length of the loop.

Example 1

In this example, a sheath/core bicomponent fiber was spun with a 40% sheath of modacrylic polymer and a 60% core with poly (metaphenylene isophthalamide) (MPD-I) with a 2.5 weight percent carbon-black loading in the core without any pigment in the sheath (1.5 weight percent carbon black loading in the fiber).

A 30 weight percent solution of modacrylic polymer in DMAc was prepared by dissolving a suitable amount of fiber made from modacrylic polymer in DMAc. A 19.3 weight percent solution of MPD-I polymer in DMAc was also obtained by polymerizing the polymer in that solvent.

Independently controlled streams of the modacrylic polymer solution and MPD-I polymer solution were then fed to spin-cell for dry spinning a sheath of modacrylic polymer over a core of MPD-I polymer. The spin-cell was equipped with a spinneret assembly to produce the sheath/core filaments before entering into the top of the spin-cell. The spinneret assembly, such as detailed in FIGS. 1-3 of U.S. Pat. No. 5,505,889, included a meter plate and spinneret to produce the desired sheath-core structure from the two solutions. The spinneret was provided with 791 holes, each with a diameter of 0.005 inches and a length of 0.01 inches. The spinneret assembly further comprised of steam passages such that the temperature of the solutions as they traveled through the meter plate and spinneret are controlled between 100 and 150° C.

The flow rate of the modacrylic and MPD-I polymer solutions in the streams was controlled independently with two different metering pumps. A separate additive dispersion containing carbon-black was made by mixing an amount of carbon-black with a MPD-I solution and then milling the dispersion to achieve a uniform particle distribution. This dispersion was then injected into the core stream of MPD-I polymer solution prior to the spinneret at a flow rate suitable to obtain a 2.5 weight percent carbon-black loading in this stream.

The bundle of individual modacrylic/MPD-I sheath/core filaments with carbon-black leaving the spinneret assembly were subjected to heated nitrogen gas to remove some of the DMAc from the filaments; the filaments were further quenched with an aqueous liquid at the exit of the spin-cell.

A sample of the threadline bundle produced from this process was taken after quenching and an optical microscope image of the cross section of the sheath-core bicomponent filaments was taken and shown in FIG. 1. The sheath core structure of the fiber is apparent along with the black core.

The quenched modacrylic/MPD-I sheath/core fiber with carbon-black was further processed on a wash/draw machine to further draw the filaments 3.6 times and extract additional DMAc solvent such that the residual concentration was less than 1 weight percent. The fiber was then dried and further heat treated using steam dryers and electrically heated drums, followed by the application of spin-finish before being wound on a bobbin.

Example 2

Examples 1 is repeated but with a spinneret that provides a side-by-side bicomponent filament structure, wherein the weight ratio of the first side of aramid polymer containing carbon particles to the second side of modacrylic polymer without carbon particles is 60:40 as in that example. Due to the additional mass on the first side, that side encloses more than 50 percent of the circumference of the second side, making a side-by-side bicomponent filament that functions similar to a sheath-core.

Example 3

The procedure shown in Examples 1 and 2 is repeated, however, in addition the modacrylic stream contains a dispersion of rutile titanium dioxide (TiO$_2$) pigment in DMAc. This stable dispersion contains polymer and about 30 weight percent TiO$_2$ in DMAc, which is milled to achieve a uniform distribution of the TiO$_2$ in the dispersion. This milled dispersion is then added to the stream of modacrylic polymer in an amount that is equal to a final concentration of 15 weight percent TiO$_2$ in the modacrylic polymer. In this matter sheath-core filaments having the TiO$_2$ pigment in the sheath, and side-by-side filaments having the TiO$_2$ pigment in one side, are made.

What is claimed is:

1. A yarn comprising a plurality of bicomponent filaments,
    the bicomponent filaments having a first region comprising a first polymer composition and a second region comprising a second polymer composition, each of the first and second regions being distinct in the bicomponent filaments;
    each bicomponent filament comprising 5 to 60 weight percent of the first polymer composition and 95 to 40 weight percent of the second polymer composition;
    wherein the first polymer composition comprises aramid polymer containing 0.5 to 10 weight percent discrete carbon particles based on the amount of carbon particles in the first composition, homogeneously dispersed in the first region in the filament; and
    wherein the second polymer composition comprises modacrylic polymer being free of discrete carbon particles;
    the yarn having a total content of 0.1 to 5 weight percent discrete carbon particles.

2. The yarn of claim 1 wherein each bicomponent filament comprises 30 to 60 weight percent of the first polymer composition and 70 to 40 weight percent of the second polymer composition.

3. The yarn of claim 1 wherein the second polymer composition further comprises at least one masking pigment.

4. The yarn of claim 3 wherein the at least one masking pigment is present in the second polymer composition in an amount of 5 to 25 weight percent.

5. The yarn of claim 4 wherein the at least one masking pigment is present in the second polymer composition in an amount of 10 to 20 weight percent.

6. The yarn of claim 1 wherein the at least one masking pigment is present in the bicomponent filaments in an amount of 2.5 to 22.5 weight percent.

7. The yarn of claim 1 wherein the bicomponent filaments have a sheath-core structure with the first region being the core and the second region being the sheath.

8. The yarn of claim 1 wherein the bicomponent filaments have a side-by-side structure with the first region being a first side of the filament and the second region being a second side of the filament.

9. The yarn of claim 1 wherein the yarn has a total content of 0.1 to 3 weight percent discrete carbon particles.

10. A fabric comprising the yarn of claim 1.

11. An article of thermal protective clothing comprising the fabric of claim 10.

12. An article of thermal protective clothing comprising the yarn of claim 1.

* * * * *